(12) United States Patent
Takahashi et al.

(10) Patent No.: US 7,240,752 B2
(45) Date of Patent: Jul. 10, 2007

(54) VEHICULAR ELECTRICAL EQUIPMENT UNIT HEATING AND COOLING SYSTEM AND HYBRID VEHICLE

(75) Inventors: Yoshiaki Takahashi, Saitama (JP); Harumi Takedomi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 169 days.

(21) Appl. No.: 10/890,292

(22) Filed: Jul. 14, 2004

(65) Prior Publication Data

US 2005/0011692 A1 Jan. 20, 2005

(30) Foreign Application Priority Data

Jul. 15, 2003 (JP) ............... P.2003-274876
May 14, 2004 (JP) ............... P.2004-145238

(51) Int. Cl.
*H01M 10/50* (2006.01)
(52) U.S. Cl. ............... 180/68.1; 180/65.1; 454/143
(58) Field of Classification Search ............ 180/65.1, 180/65.3, 68.1–2, 68.5, 311–313; 429/120, 429/26, 62; 454/143, 145, 120, 144, 149, 454/151, 155, 162, 164, 165; *B60K 6/04; B60R 16/04*
See application file for complete search history.

(56) References Cited

U.S. PATENT DOCUMENTS

| | | | | |
|---|---|---|---|---|
| 5,490,572 A | * | 2/1996 | Tajiri et al. ............... | 180/65.1 |
| 5,704,644 A | * | 1/1998 | Jaggi ............... | 280/796 |
| 6,220,383 B1 | * | 4/2001 | Muraki et al. ............... | 180/68.5 |
| 6,315,069 B1 | * | 11/2001 | Suba et al. ............... | 180/68.5 |
| 6,662,891 B2 | * | 12/2003 | Misu et al. ............... | 180/68.1 |
| 6,811,197 B1 | * | 11/2004 | Grabowski et al. ............... | 296/37.8 |
| 6,978,855 B2 | * | 12/2005 | Kubota et al. ............... | 180/65.3 |
| 7,048,321 B2 | * | 5/2006 | Bandoh et al. ............... | 296/37.8 |

FOREIGN PATENT DOCUMENTS

| FR | 2829619 A | * | 3/2003 |
|---|---|---|---|
| JP | 06283213 | * | 10/1994 |
| JP | 2002-231321 | | 8/2002 |
| JP | 2003-079003 | | 3/2003 |

* cited by examiner

*Primary Examiner*—Christopher P. Ellis
*Assistant Examiner*—Vaughn T. Coolman
(74) *Attorney, Agent, or Firm*—Arent Fox LLP (57) ABSTRACT

A vehicular electrical equipment unit heating and cooling system includes a vehicular electrical equipment unit 10 including a battery 21 and an inverter YBU5 22 which are accommodated in a primary air passageway 14, an air inlet 44 through which air in a passenger compartment 6 is admitted to the primary air passageway 14, an air outlet 46 through which air flowing in the primary air passageway 14 is discharged to the outside of the electrical equipment unit 10, a subsidiary air passageway 30 connected to and cut off from the primary air passageway 14 to make a closed circuit 60 when connected to the primary air passageway 14, and a fan 40 for generating a flow of air in the primary air passageway 14.

12 Claims, 4 Drawing Sheets

VEHICULAR ELECTRICAL EQUIPMENT UNIT HEATING AND COOLING SYSTEM AND HYBRID VEHICLE

BACKGROUND OF THE INVENTION

The present invention relates to a vehicular electrical equipment unit heating and cooling system for heating or cooling an electrical equipment unit on an electric vehicle which runs only by the driving force of a motor or a so-called hybrid vehicle which runs by driving forces of an engine and a motor.

In the electric vehicle or hybrid vehicle, when electricity is supplied from the battery which is a direct current power supply to the motor, a direct current is converted into an alternating one by the inverter, and furthermore, in the hybrid vehicle, when part of the output of the engine or the kinetic energy of the vehicle is stored in the battery via the motor, an alternating current is converted into a direct one by the inverter.

Incidentally, while the battery and the inverter entrains heat when they are in operation, in the event that the temperature of the battery increases too high, the charging and discharging performance of the battery is decreased, and the life of the battery is made shorter, and in the event that a certain heat-resistant temperature is exceeded, there is caused a risk that the inverter is damaged. Consequently, a cooling apparatus for cooling the battery or the inverter is required, and there occurs a case where air inside the passenger compartment is used as a cooling medium for the cooling apparatus (for example, refer to a patent literature No. 1).

In addition, since the charging and discharging performance of the battery is also decreased when the temperature thereof becomes too low, a heating apparatus is required. Then, it is considered to use air in the passenger compartment as a heating medium for heating the battery.

When the air in the passenger compartment is used as the cooling medium or heating medium as is described above, an air passageway for passing air therethrough is required. For example, in a cooling apparatus disclosed in a patent literature No. 2, a space defined by a deck side, a rim and a body outer is used as a duct (an air passageway).

[Patent Literature No. 1]
JP-A-2003-79003

[Patent Literature No. 2]
JP-A-2002-231321

Here, as to the heating of the battery, it is desired that the heating performance is improved and that the effect on the control of passenger compartment temperature is reduced.

In addition, in vehicles where space is limited, the volume of the air flow path is required to be decreased. In addition, there is a big demand to decrease the costs.

Then, an object of the invention is to provide a vehicular electrical equipment unit heating and cooling system which can attempt to make the system compact in size, reduce the costs and improve the heating performance and a hybrid vehicle in which the vehicular electrical equipment unit heating and cooling system is installed.

SUMMARY OF THE INVENTION

With a view to solving the problems, according to a first aspect of the invention, there is provided a vehicular electrical equipment unit heating and cooling system including a vehicular electrical equipment unit (for example, an electrical equipment unit 10 in an embodiment that will be described later on) including at least a battery (for example, a battery 21 in the embodiment) and an inverter (for example, an inverter unit 22 in the embodiment) which are accommodated in a first air passageway (for example, a primary air passageway 14 in the embodiment) in the interior of a housing (for example, a housing 11 in the embodiment), an air inlet (for example, an inlet 44 in the embodiment) through which air in a passenger compartment (for example, a passenger compartment 6 in the embodiment) is admitted to the first air passageway, an air outlet (for example, an air outlet 46 in the embodiment) through which air flowing in the first air passageway is allowed to be discharged to the outside of the electrical equipment unit, a second air passageway (for example, a subsidiary air passageway 30 in the embodiment) provided adjacent to the electrical equipment unit and adapted to be connected to and cut off from the first air passageway to thereby make a closed circuit when connected to the first air passageway, and a blower section (for example, a fan 40 in the embodiment) for generating a flow of air in the first air passageway, wherein when cooling the battery, air in the passenger compartment is induced from the air inlet into the first air passageway as a cooling medium, and after being directed from the battery toward the inverter, the air is discharged from the air outlet, whereas when heating the battery, air in a closed circuit (for example, a closed circuit 60 in the embodiment) made by allowing the second air passageway to be connected to the first air passageway is circulated within the closed circuit.

According to the construction, when cooling the battery, air in the passenger compartment whose temperature is lower than that of the battery is induced to flow through the first air passageway in the electrical equipment unit, whereby firstly, the battery is cooled with the air, the inverter is then cooled with the air that has used to cool the battery, and thereafter, the air can be discharged through the air outlet. In addition, when heating the battery, air is circulated in the closed circuit made by connecting the second air passageway with the first air passageway in the electrical equipment unit, so that air is wormed with heat from the inverter, whereby the battery can be heated with the air so wormed. There exists no air communication with the passenger compartment while air is circulated in the closed circuit.

According to a second aspect of the invention, there is provided a vehicular electrical equipment unit heating and cooling system as set forth in the first aspect of the invention, wherein a wall portion surrounding the second air passageway includes the housing of the electrical equipment unit, a body structure (for example, a floor panel 4 and a body cross member 5 in the embodiment) of a vehicle and a seat portion (for example, a rear seat portion 3 in the embodiment) of the vehicle.

According to the construction, since the necessity is obviated of an exclusive wall portion for defining the second air passageway, the volume of the second air passageway including the wall portion can be decreased, and the number of components can be decreased.

According to a third aspect of the invention, there is provided a vehicular electrical equipment unit heating and cooling system as set forth in the first or second aspect of the invention, wherein a first opening and closing section (for example, a primary shutter 51 in the embodiment) is provided in the second air passageway which is adapted to open to connect the first air passageway with the second air passageway when an amount of air that is less than a predetermined flow rate flows in the first air passageway and to close to shut off the second air passageway when an amount of air that is equal to or more than the predetermined flow rate flows in the first air passageway, and wherein a second opening and closing section (for example, a secondary shutter 52 in the embodiment) is provided in the air outlet which is adapted to close the air outlet when an amount of air that is less than a predetermined flow rate flows in the first air passageway and to open the air outlet when an amount of air that is equal to or more than the predetermined flow rate flows in the first air passageway.

According to the construction, since the first opening and closing section is opened and the second opening and closing section is closed when the amount of air that is less than the predetermined flow rate flows in the first air passageway, air can be circulated in the closed circuit made by connecting the second air passageway with the first air passageway. On the other hand, when the amount of air that is equal to or more than the predetermined flow rate flows in the first air passageway, since the first opening and closing section is closed and the second opening and closing section is opened, there is no air flowing in the second air passageway, whereby air in the passenger compartment that is induced from the air inlet is passed through the first air passageway, and thereafter, the air can be discharged from the air outlet.

According to a fourth aspect of the invention, there is provided a vehicular electrical equipment unit heating and cooling system as set forth in the third aspect of the invention, wherein the first opening and closing section and the second opening and closing section are biased in an open direction or closed direction by virtue of their own weights or an elastic force of an elastic body.

According to the construction, both the first and second opening and closing sections can be opened and closed with a force based on the flow of air that passes through the first air passageway.

According to a fifth aspect of the invention, there is provided a hybrid vehicle (for example, a hybrid vehicle 100 in the embodiment) driven by transmitting a driving force of at least either of an engine and a motor to driving wheels thereof wherein a fuel tank (for example, a fuel tank 70 in the embodiment) for storing fuel for the engine is disposed under a front seat portion (for example, a front seat portion 7 in the embodiment) of the vehicle, wherein a vehicular electrical equipment unit heating and cooling system (for example, a heating and cooling apparatus 2 in the embodiment) as set forth in any of the first to fourth aspects of the invention is disposed under a rear seat portion (for example, a rear seat portion 3 in the embodiment) of the vehicle, and wherein the battery in the vehicular electrical equipment unit supplies electric power to the motor via the inverter.

According to the construction, in the hybrid vehicle, a passenger compartment is allowed to communicate with a trunk by folding forward a seat back of the rear seat portion.

According to the first aspect of the invention, there are provided superior advantages that the battery can be cooled efficiently by passing air in the passenger compartment into the first air passageway in the electrical equipment unit by shutting off the second air passageway, and additionally that the battery can be heated efficiently by circulating air in the closed circuit made by connecting the second air passageway with the first air passageway. Moreover, since the air is circulated in the closed circuit when the battery is being heated, resulting in no air communication with the passenger compartment during the heating of the battery, there is provided a superior advantage that the heating process of the battery has no effect on the control of the passenger compartment temperature.

According to the second aspect of the invention, since the volume of the second air passageway including the wall portion can be decreased, the heating and cooling system can be made compact in size, and the costs can be attempted to be decreased by decreasing the number of components involved.

According to the third aspect of the invention, since air can be circulated in the closed circuit made by connecting the second air passageway with the first air passageway, the battery can be heated quickly, and additionally, since the amount of air can be increased when air in the passenger compartment that is induced from the air inlet is passed through the first air passageway and is then discharged from the air outlet, the battery can be cooled efficiently.

According to the fourth aspect of the invention, since the first and second opening and closing sections can both be opened and closed with the force based on the flow of air passing through the first air passageway, the necessity is obviated of an electrical control for opening and closing the first and second opening and closing sections, thereby making it possible to attempt to simplify the construction of the system, decrease the number of components involved and decrease the costs.

According to the fifth aspect of the invention, in the hybrid vehicle, the passenger compartment and the trunk are allowed to communicate with each other by folding forward the seat back of the rear seat.

DETAILED DESCRIPTION OF THE PREFERRED EMBODIMENTS

Hereinafter, embodiments of a vehicular electrical equipment heating and cooling system according to the invention and a hybrid vehicle equipped with the system will be described by reference to FIGS. 1 to 7.

The vehicular electrical equipment unit heating and cooling system according to an embodiment is installed in a so-called hybrid vehicle driven by transmitting the driving force of at least either of an engine and a motor to driving wheels thereof.

Figure 1:
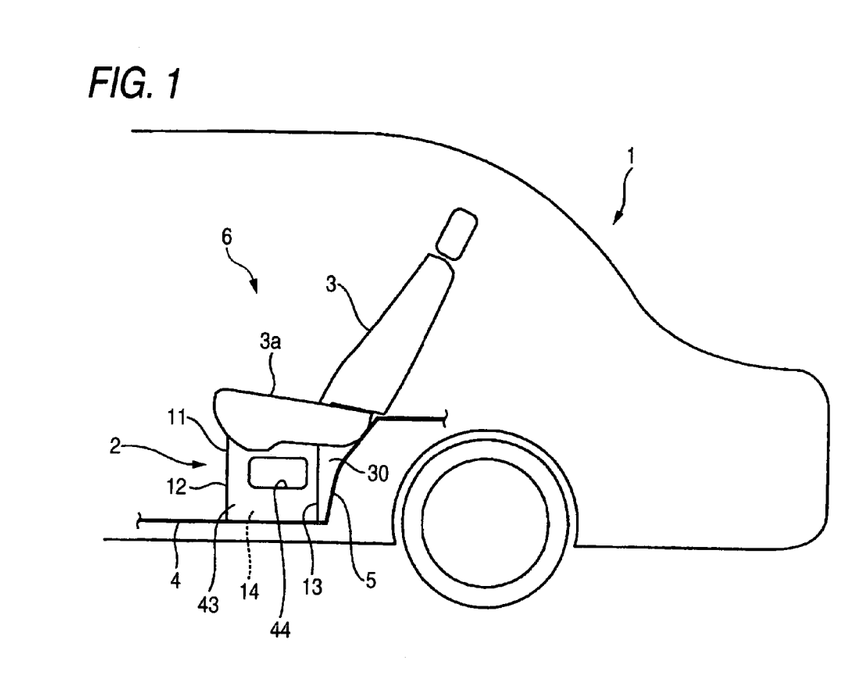
FIG. 1 is a perspective view of a left-hand side of a rear part of a hybrid vehicle 1 of an embodiment of the invention which is provided with a vehicular electrical equipment unit heating and cooling system according the invention.
Figure 2:
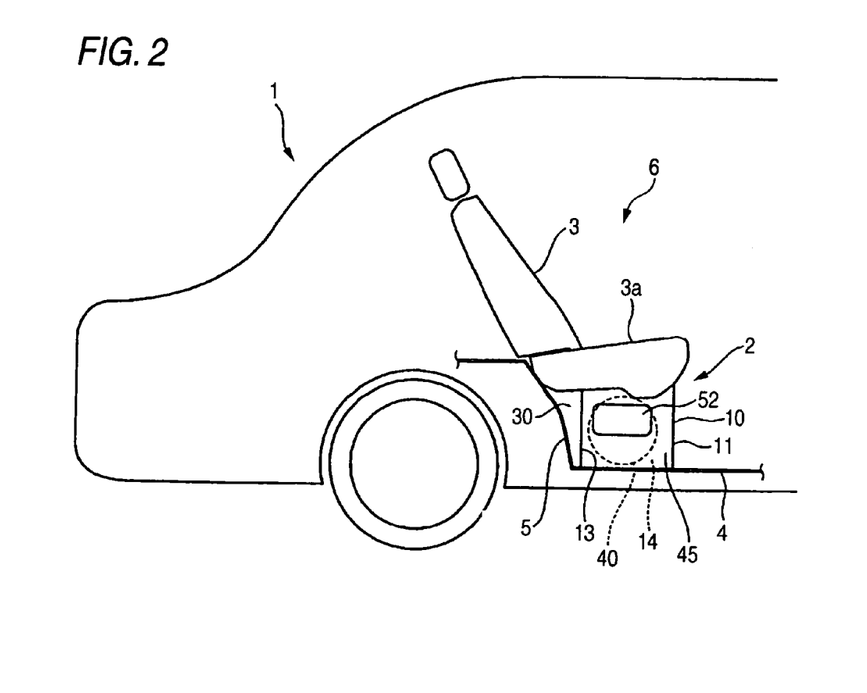
FIG. 2 is a perspective view of a right-hand side of the rear part of the vehicle of the same embodiment.
Figure 3:
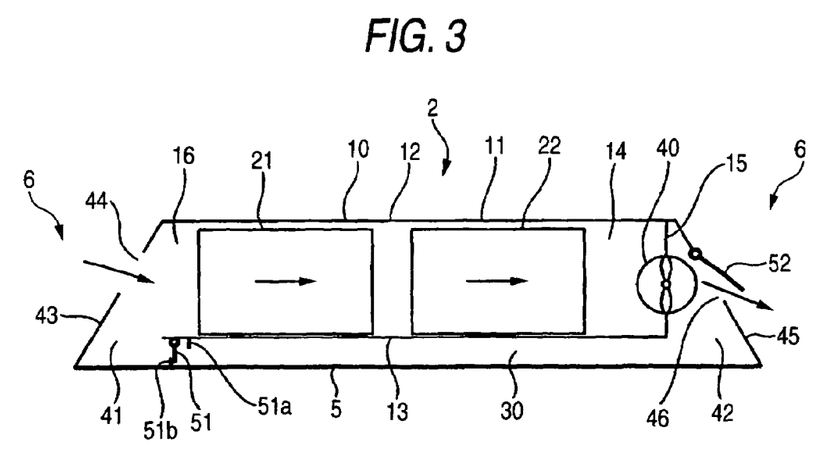
FIG. 3 is a transverse cross-sectional view of the vehicular electrical equipment unit heating and cooling system according to the embodiment which is in a cooling operation.
Figure 4:
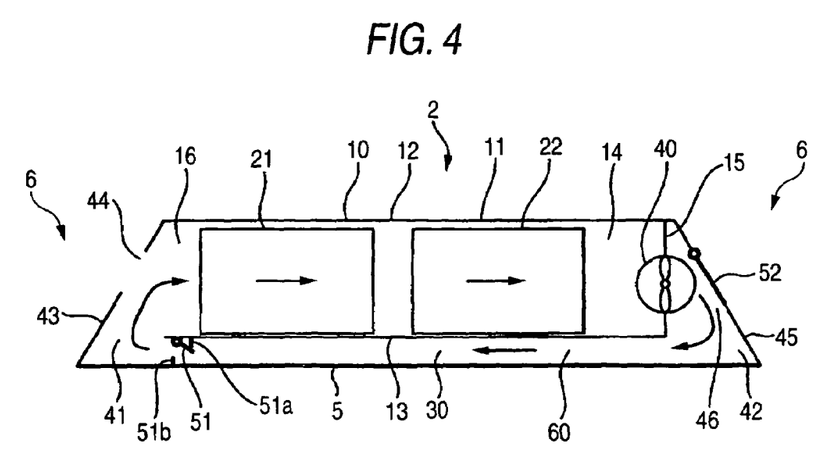
FIG. 4 is a transverse cross-sectional view of the vehicular electrical equipment unit heating and cooling system according to the embodiment which is in a heating operation.

FIG. 1 is a perspective view of a left-hand side of a rear part of a hybrid vehicle 1, FIG. 2 is a perspective view of a right-hand side of the rear part of the same vehicle, and FIGS. 3 and 4 are transverse cross-sectional views of a vehicular electrical equipment unit heating and cooling system 2. Note that in the following description, "front", "rear", "left" and "right" indicate directions as viewed from the driver.

In the hybrid vehicle 1, when the motor is energized from a battery which is a direct current power supply, a direct current is converted into an alternating one by an inverter, and additionally, when part of the output of the engine or the kinetic energy of the vehicle 1 is stored in the battery via the motor, an alternating current is converted into a direct one by the inverter. In addition, since a direct current voltage converted by the inverter is a high voltage, part thereof is decreased in voltage by a DC/DC converter. Then, the vehicular electrical equipment unit heating and cooling system 2 according to the embodiment is such as to cool the DC/DC converter while heating or cooling the battery.

As shown in FIGS. 1 and 2, the heating and cooling system 2 is disposed between the underside of a seat cushion 3a of a rear seat (seat portion) 3 and a floor panel 4 of the vehicle and is disposed in front of a body cross member 5 which is provided so as to connect to the floor panel 4. Here, the floor panel 4 and the body cross member 5 constitute a body structure of the vehicle 1.

The heating and cooling system 2 includes a vehicular electrical equipment unit (hereinafter, referred to as an electrical equipment unit) 10, a subsidiary air passageway 30 provided adjacent to the electrical equipment unit 10, a fan (a blower section) 40, left and right corner spaces 41, 42, a primary shutter (a primary opening and closing section) 51, and a secondary shutter (a secondary opening and closing section) 52.

The electrical equipment unit 10 has a housing 11 for defining air passageways, and the floor panel 4 and the seat cushion 3a of the rear seat 3 constitute part of the housing 11. Namely, the housing 11 of the electrical equipment unit 10 is formed into a hollow tubular shape by the floor panel 4 made to double as a bottom plate of the housing 11, the seat cushion 3a made to double as a top plate of the housing 11, a front end plate 12 and a rear end plate 13.

The interior of the housing 11 is made to be a primary air passageway 14 which allows air to flow in a transverse direction, and a fan mounting plate 15 on which a fan 40 is provided is mounted at a right end portion of the housing 11. The fan 40 generates a flow of air which flows from left to right along the transverse direction in the primary air passageway 14 by drawing air within the primary air passageway 14 to discharge the same to the outside of the housing 11. Note that a left end portion of the primary air passageway 14 is left open.

A battery 21 is accommodated in the primary air passageway 14 at a position near an opening 16 at the left end portion, and an inverter unit 22 having the inverter and the DC/DC converter is accommodated in the same passageway at a position near the fan 40. Namely, in the primary air passageway 14, the battery 21 is disposed upstream and the inverter unit 22 is disposed downstream of the air flow.

The subsidiary air passageway 30 is provided adjacent to the housing 11 on a rear side of the housing 11. The subsidiary air passageway 30 has no exclusive wall portion which surrounds the periphery thereof. Namely, the underside of the subsidiary air passageway 30 is defined by the floor panel 4, the top side thereof is defined by the seat cushion 3a, the front side thereof is defined by a rear end plate 13 of the housing 11 and the rear side thereof is defined by the body cross member 5, thus, the other members being made to double as the wall portions of the subsidiary air passageway 30. As is described, since the subsidiary air passageway 30 has no exclusive wall portion, the volume thereof can be attempted to be increased, or, in other words, the volume of the subsidiary air passageway 30 including the wall portions can be attempted to be reduced. In addition, the number of components involved in the heating and cooling system 2 can be reduced, thereby making it possible to decrease the costs.

The subsidiary air passageway 30 is made open at both ends thereof so as to allow air to flow in the transverse direction.

The primary air passageway 14 and the subsidiary air passageway 30 are connected to each other between left end portions thereof via the left corner space 41 and between right end portions thereof via the right corner space 42.

The underside of the left corner space 41 is defined by the floor panel 4, the top side thereof is defined by the seat cushion 3a, the rear side thereof is defined by the body cross member 5, and the left-hand side thereof is defined by a left-hand side plate 43 which connects the body cross member 5 with the front end plate 12. Namely, the other members but for the left-hand side plate 43 are made to double as the wall portions of the left corner space 41, as well. An air inlet 44 is opened in the left-hand side plate 43 for admitting air in a passenger compartment 6 to the corner space 41.

The underside of the right corner space 42 is defined by the floor panel 4, the top side thereof is defined by the seat cushion 3a, the rear side thereof is defined by the body cross member 5 and the right side thereof is defined by a right-hand side plate 45 which connects the body cross member 5 with the front endplate 12. Namely, the other members but for the right-hand side plate 45 are made to double as the wall portions of the right corner space 42, as well. An air outlet 46 is opened in the right-hand side plate 45 for allowing air in the right corner space 42 to be discharged into the passenger compartment 6. The air outlet 46 is disposed at a position which substantially confronts the fan 40, and air discharged from the primary air passageway 14 by the fan 40 is blown to the secondary shutter 52, whereby a wing pressure is applied to the secondary shutter 52.

The primary shutter (the primary opening and closing section) 51 for opening and closing the subsidiary air passageway 30 is rotationally mounted at a left end portion of the rear end plate 13 of the housing 11. This primary shutter 51 is biased in an open direction by an elastic body (not shown) such as a spring, and as shown in FIG. 4, the range of opening operation of the primary shutter 51 is limited by a stopper 51a such that an opening action thereof comes to an end when a substantially half-open condition is realized, and additionally, as shown in FIG. 3, the range of closing operation thereof is limited by a stopper 51b such that a closing action thereof comes to an end with the subsidiary air passageway 30 being in a closed condition when the primary shutter 51 is rotated in a closing direction against the elasticity of the elastic body.

The secondary shutter (the secondary opening and closing section) 52 for opening and closing the air outlet 46 is rotationally mounted on an exterior side of the right-hand side plate 45. This secondary shutter 52 is biased in the closing direction by an elastic body (not shown) such as a spring, and the secondary shutter 52 is adapted to close the air outlet 46 by being brought into abutment with the exterior side of the right-hand side plate 45 as shown in FIG. 4, whereas as shown in FIG. 3, when rotated to the passenger compartment 6 side against the elasticity of the elastic body, the secondary shutter 52 opens the air outlet 46.

Air flow path in the heating and cooling system 2 that is constructed as is described heretofore will be described. In this heating and cooling system 2, the flow rate of air flowing through the primary air passageway 14 is controlled by the fan 40, and the primary shutter 51 and secondary shutter 52 are controlled to be opened or closed according to the flow rate of air flowing through the primary air passageway 14.

Namely, in the event that the flow rate of air flowing through the primary air passageway 14 is made to be equal to or larger than a predetermined flow rate, since an air pressure applied to the secondary shutter 52 by the fan 40 is increased, the secondary shutter 52 is forced to be rotated outwardly by the air pressure so applied, as shown in FIG. 3, whereby the air outlet 46 is opened. In addition, part of air that is discharged into the right corner space 42 flows into the subsidiary air passageway 30, and the air pressure of the air that has so flowed in is allowed to act on the primary shutter 51, as a result, the primary shutter 51 being forced to rotate in the closing direction against the elasticity to thereby close the subsidiary air passageway 30.

Consequently, in the event that the flow rate of air flowing through the primary air passageway 14 is made to be equal to or larger than the predetermined flow rate, since the subsidiary air passageway 30 is closed, there is no air flowing into the subsidiary air passageway 30. Then, air inside the passenger compartment 6 is induced from the air inlet 44 into the left corner space 41, passes through the primary air passageway 14, is discharged into the right corner space 42 via the fan 40, and furthermore, is discharged from the air outlet 46 into the passenger compartment 6.

On the other hand, in the event that the flow rate of air passing through the primary air passageway 14 is made to be less than the predetermined flow rate, since the air pressure applied to the secondary shutter 52 by the fan 40 is small, the secondary shutter 52 cannot be rotated in the opening direction with the air pressure so applied thereto, whereby the secondary shutter 52 closes the air outlet 46, as shown in FIG. 4. Due to this, air discharged into the right corner space 42 has no choice but to flow into the subsidiary air passageway 30, and thus, air so discharged flows through the subsidiary air passageway 30. Since the flow rate of air flowing through the subsidiary air passageway 30 is small, the primary shutter 51 cannot be rotated in the closing direction against the elasticity using the air pressure which is small, whereby the primary shutter 51 is held in a half-open condition.

Consequently, in the event that the flow rate of air flowing through the primary air passageway 14 is made smaller than the predetermined flow rate, the primary air passageway 14 and the subsidiary air passageway 30 are connected to each other via the left and right corner spaces 41, 42 so as to define a closed circuit 60, whereby air is allowed to circulate within the closed circuit 60. As this occurs, there is almost no air communicating between the heating and cooling system 2 and the passenger compartment 6.

Thus, since the primary shutter 51 and the secondary shutter 52 can be opened and closed by virtue of the force (the air pressure) based on the flow of air flowing through the primary air passageway 14, no electrical control is required, thereby making it possible to attempt to simplify the construction of the system, decrease the number of components involved and reduce the costs.

Next, the control of heating and cooling the electrical equipment unit 10 according to the embodiment will be described by following a flowchart shown in FIG. 5.

Figure 5:
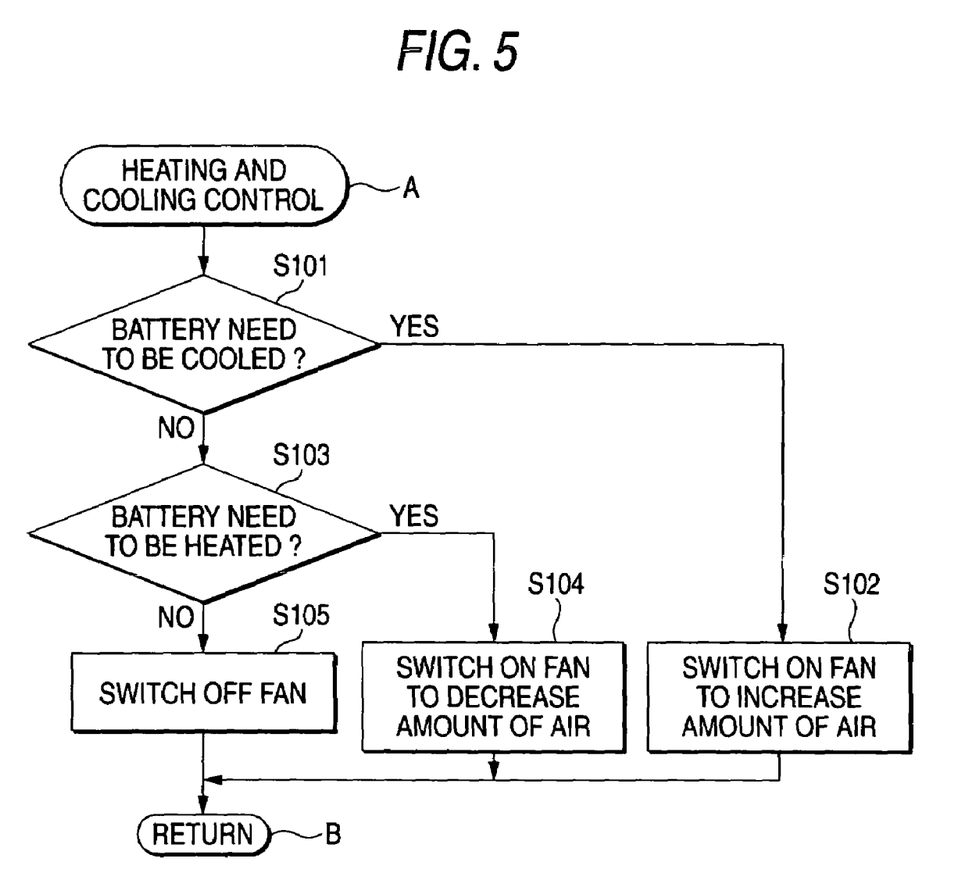
FIG. 5 is a flowchart showing heating and cooling controls according to the embodiment.

A heating and cooling control routine shown in the flowchart in FIG. 5 is executed repeatedly at certain time intervals by an electronic control unit, not shown.

Firstly, in step S101, whether or not the battery 21 needs to be cooled is determined based on the temperature of the battery 21, and if the result of the determination is "YES" (cooling is required), then, proceed to step S102, where the fan 40 is operated at high rotational speed so as to increase the flow rate of air (amount of air) to a level equal to or higher than the predetermined flow rate, and the execution of the routine is stopped temporarily.

When air flows through the primary air passageway 14 in the predetermined flow rate or larger, as is described above, the primary shutter 51 closes the subsidiary air passageway 30, while the secondary shutter 52 opens the air outlet 46 (refer to FIG. 3). As a result, air in the passenger compartment 6 whose temperature is lower than that of the battery 21 is induced from the air inlet, and after having flowed through the primary air passageway 14, the air is discharged from the air outlet 46 into the passenger compartment 6.

Here, since the battery 21 is disposed upstream of the inverter unit 22 along the flow of air, the air in the passenger compartment 6 whose temperature is so low cools the battery 21 first and then the inverter unit 22. Consequently, the battery 21 can be cooled with extreme efficiency. Moreover, since this cooling process can be carried out while allowing air to flow in a large flow rate, the battery 21 and the inverter unit 22 can be cooled efficiently.

In contrasts, if the result of the determination instep S101 is "NO" (no cooling is required), then, proceed to step S103, where whether or not the battery 21 needs to be heated is determined based on the temperature of the battery 21.

If the result of the determination in step S103 is "YES" (heating is required), then proceed to step S104, where the fan 40 is operated at low rotational speed so as to decrease the flow rate (amount) of air flowing through the primary air passageway 14 lower than the predetermined flow rate, and the execution of the routine is stopped temporarily.

In the event that a smaller amount of air than the predetermined flow rate flows through the primary air passageway 14, as is described above, the primary shutter 51 opens the subsidiary air passageway 30, while the secondary shutter 52 closes the air outlet 46, whereby the primary air passageway 14 and the subsidiary air passageway are connected to each other, whereby the closed circuit 60 is made (refer to FIG. 4). As a result, air within the closed circuit 60 is allowed only to circulate within the closed circuit 60, causing no air coming out of and going into the passenger compartment 6. Thus, when air circulates in the closed circuit 60, the air is heated through heat exchange with the inverter unit 22, whereby the battery 21 can be heated with the air so heated. In addition, since there is produced no air coming out of and going into the passenger compartment 6, there is extremely little air dissipated from the heating and cooling system 2, and therefore, the battery 21 can be heated with extreme efficiency. Furthermore, since there is no air coming out of and going into the passenger compartment 6 while the battery 21 is being heated, there is no effect imposed on the control of the temperature of air in the passenger compartment 6 by an air conditioner (not shown).

In contrast, in the event that the result of the determination in step S103 is "NO" (no heating is required), then proceed to step S105, where the fan 40 is stopped, and the execution of the routine is stopped temporarily.

Figure 6:
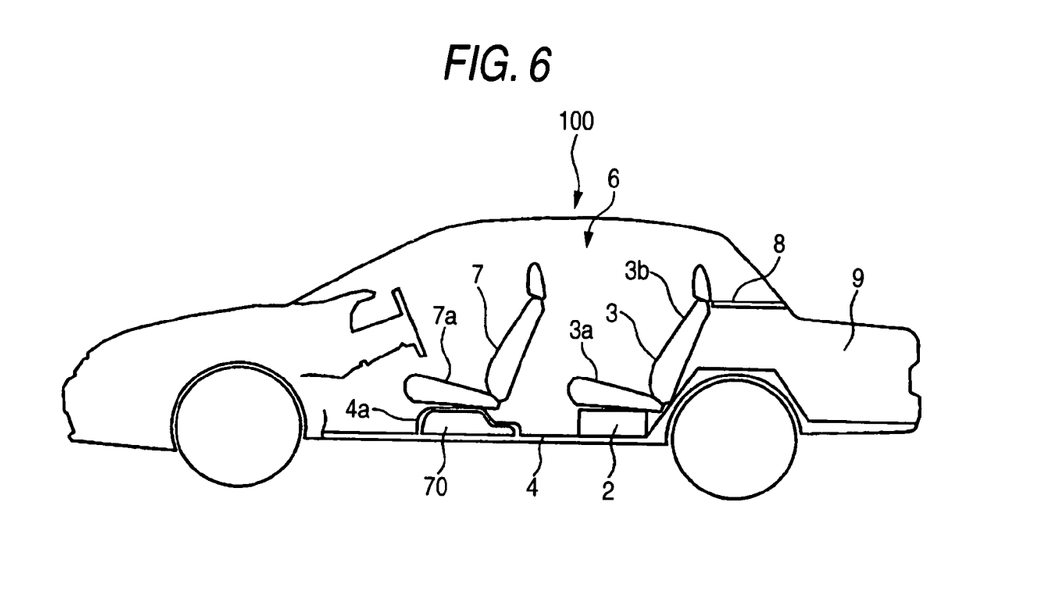
FIG. 6 is a perspective view showing schematically the construction of the hybrid vehicle according to another embodiment which is provided with the vehicular electrical equipment unit heating and cooling system of the invention in which a seat back of a rear seat is in an erected state.
Figure 7:
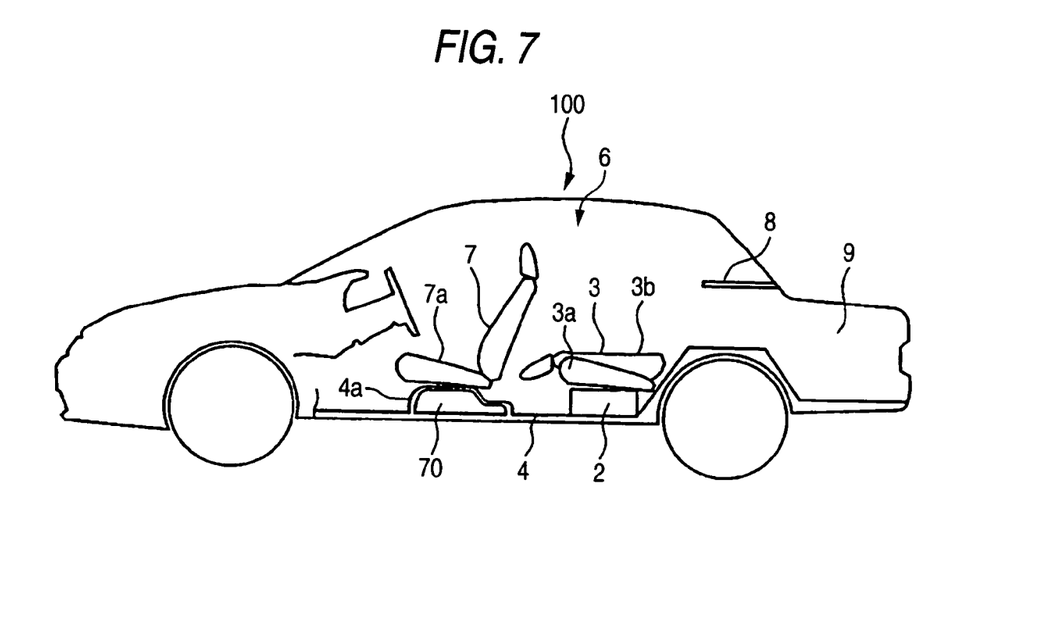
FIG. 7 is a perspective view showing schematically the construction of the hybrid vehicle according to the embodiment in which the seat back of the rear seat is in a forward-folded state.

FIGS. 6 and 7 are perspective views showing schematically the construction of a hybrid vehicle according to another embodiment. A hybrid vehicle 100 according to the embodiment is also a hybrid vehicle, such as the one described in the previous embodiment, driven by transmitting the driving force of at least either of an engine and a motor (neither of them are shown) to driving wheels thereof.

In this hybrid vehicle 100, a floor panel 4 is expanded upwardly below a seat cushion 7a of a front seat 7, and a fuel tank 70 for storing fuel (for example, gasoline) for the engine is disposed on the underside of the expanded portion 4a. Namely, the fuel tank 70 is disposed under the front seat 7.

In addition, a vehicular electrical equipment unit heating and cooling system 2 is disposed under a seat cushion 3a of a rear seat 3. A vehicular electrical equipment unit is identical to that descried in the first embodiment and includes a battery and an inverter which are used for supplying electric power to the motor. The heating and cooling system 2 is also identical to that described in the first embodiment, and therefore, the description thereof will be omitted.

A seat back 3b of the rear seat 3 is provided in such a manner as to be folded forward, and as shown in FIG. 6, when the seat back 3b is erected, an upper portion of the seat back 3b is allowed to abut with a rear shelf 8. In this condition, the seat back 3b separates the passenger compartment 6 in front thereof from a trunk 9 behind it.

In the hybrid vehicle that is constructed as is described just above, as shown in FIG. 7, when the seat back 3b of the rear seat is folded forward over the seat cushion 3a, the passenger compartment 6 is allowed to communicate with the trunk 9, whereby a so-called "trunk-through" condition can be provided, thereby the usage of the passenger compartment 6 and the trunk 9 being improved.

[Other Embodiments]

Note that the invention is not limited to the embodiments that are described heretofore.

For example, while, in the above embodiments, the primary opening and closing unit and the secondary opening and closing unit are biased in the opening or closing direction by virtue of the elastic force of the elastic bodies, the opening and closing units can be biased in the opening or closing direction by their own weights, instead of the elastic force of the elastic bodies. Furthermore, the primary opening and closing unit and the secondary opening and closing unit can be driven to open and close by an electromagnetic actuator or a pneumatic actuator.

The invention can be applied to at least electrical equipment unit cooling and heating systems for vehicles provided with at least a battery and an inverter such as hybrid vehicles and electric vehicles.

What is claimed is:

1. A vehicular electrical equipment unit heating and cooling system comprising:
   a vehicular electrical equipment unit including at least a battery and an inverter which are accommodated in a first air passageway in the interior of a housing;
   an air inlet through which air in a passenger compartment is admitted to the first air passageway;
   an air outlet through which air flowing in the first air passageway is allowed to be discharged to the outside of the electrical equipment unit;
   a second air passageway provided adjacent to the electrical equipment unit and directly connected to an upstream end and a downstream end of the first passageway,
   wherein the second air passageway is adapted to be selectively connected to and cut off from the first air passageway to define a closed circuit when connected to the first air passageway; and
   a blower section for generating a flow of air in the first air passageway, wherein
   when cooling the battery, air in the passenger compartment is induced from the air inlet into the first air passageway as a cooling medium, and after being directed from the battery toward the inverter, the air is discharged from the air outlet, and
   when heating the battery, air in a closed circuit made by connecting the second air passageway to the first air passageway is circulated within the closed circuit.

2. The vehicular electrical equipment unit heating and cooling system as set forth in claim 1, wherein
   a wall portion surrounding the second air passageway includes:
   the housing of the electrical equipment unit,
   a body structure of a vehicle, and
   a seat portion of the vehicle.

3. A hybrid vehicle driven by transmitting a driving force of at least either of an engine and a motor to driving wheels thereof, comprising:
   a fuel tank for storing fuel for the engine disposed under a front seat portion of the vehicle, and
   the vehicular electrical equipment unit heating and cooling system as set forth in claim 1 disposed under a rear seat portion of the vehicle, wherein
   the battery in the vehicular electrical equipment unit supplies electric power to the motor via the inverter.

4. The vehicular electrical equipment unit heating and cooling system as set forth in claim 1, wherein
   the battery is disposed upstream and the inverter is disposed downstream of the air flow in the first air passageway.

5. The vehicular electrical equipment unit heating and cooling system as set forth in claim 1, further comprising:
   a first opening and closing section provided in the second air passageway, the first opening and closing section being adapted to open to connect the first air passageway with the second air passageway when an amount of air that is less than a predetermined flow rate flows in the first air passageway and to close to shut off the second air passageway when an amount of air that is equal to or more than the predetermined flow rate flows in the first air passageway, and
   a second opening and closing section provided in the air outlet, the second opening and closing section being adapted to close the air outlet when an amount of air that is less than a predetermined flow rate flows in the first air passageway and to open the air outlet when an amount of air that is equal to or more than the predetermined flow rate flows in the first air passageway.

6. The vehicular electrical equipment unit heating and cooling system as set forth in claim 5, wherein
   the first opening and closing section and the second opening and closing section are biased in an open direction or closed direction by virtue of an elastic force of an elastic body.

7. The vehicular electrical equipment unit heating and cooling system as set forth in claim 6, further comprising:

a first stopper for limiting the range of opening operation of the first opening closing section such that an opening action thereof comes to an end when a substantially half-open condition is realized, and a second stopper for limiting the range of closing operation the first opening closing section such that a closing action thereof comes to an end with the second air passageway being in a closed condition when the first opening closing section is rotated in a closing direction against the elastically of the elastic body.

8. A vehicular electrical equipment unit heating and cooling system comprising:

a vehicular electrical equipment unit including at least a battery and an inverter which are accommodated in a first air passageway in the interior of a housing;

an air inlet through which air in a passenger compartment is admitted to the first air passageway;

an air outlet through which air flowing in the first air passageway is allowed to be discharged to the outside of the electrical equipment unit;

a second air passageway provided adjacent to the electrical equipment unit and adapted to be connected to and cut off from the first air passageway to make a closed circuit when connected to the first air passageway;

a blower section for generating a flow of air in the first air passageway;

a first opening and closing section provided in the second air passageway, the first opening and closing section being adapted to open to connect the first air passageway with the second air passageway when an amount of air that is less than a predetermined flow rate flows in the first air passageway and to close to shut off the second air passageway when an amount of air that is equal to or more than the predetermined flow rate flows in the first air passageway, and a second opening and closing section provided in the air outlet, the second opening and closing section being adapted to close the air outlet when an amount of air that is less than a predetermined flow rate flows in the first air passageway and to open the air outlet when an amount of air that is equal to or more than the predetermined flow rate flows in the first air passageway, wherein when cooling the battery, air in the passenger compartment is induced from the air inlet into the first air passageway as a cooling medium, and after being directed from the battery toward the inverter, the air is discharged from the air outlet, and when heating the battery, air in a closed circuit made by connecting the second air passageway to the first air passageway is circulated within the closed circuit.

9. The vehicular electrical equipment unit heating and cooling system as set forth in claim 8, wherein a wall portion surrounding the second air passageway includes:

the housing of the electrical equipment unit, a body structure of a vehicle, and a seat portion of the vehicle.

10. The vehicular electrical equipment unit heating and cooling system as set forth in claim 8, wherein the battery is disposed upstream and the inverter is disposed downstream of the air flow in the first air passageway.

11. The vehicular electrical equipment unit heating and cooling system as set forth in claim 8, wherein the first opening and closing section and the second opening and closing section are biased in an open direction or closed direction by virtue of an elastic force of an elastic body.

12. The vehicular electrical equipment unit heating and cooling system as set forth in claim 10, further comprising:

a first stopper for limiting the range of opening operation of the first opening closing section such that an opening action thereof comes to an end when a substantially half-open condition is realized, and a second stopper for limiting the range of closing operation the first opening closing section such that a closing action thereof comes to an end with the second air passageway being in a closed condition when the first opening closing section is rotated in a closing direction against the elastically of the elastic body.

* * * * *